A. BARKER.
SOLDERING AND UNSOLDERING CAN-CAPS.
No. 6,846. Reissued Jan. 11, 1876.
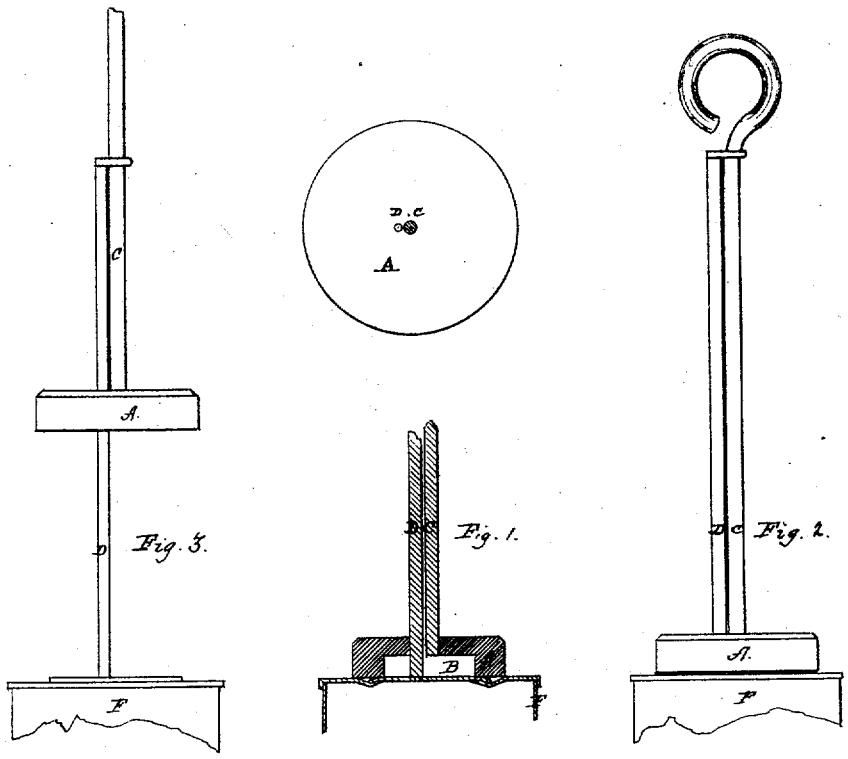
Witnesses:
Wm. M. Sargent
F. T. Stow
Inventor
Abel Barker
By Smith & Bird
att'ys.
N. PETERS, PHOTO-LITHOGRAPHER, WASHINGTON, D. C.

UNITED STATES PATENT OFFICE.

ABEL BARKER, OF WYOMING, PENNSYLVANIA, ASSIGNOR OF ONE-HALF INTEREST TO EDWARD M. LANG, OF PORTLAND, MAINE.

IMPROVEMENT IN SOLDERING AND UNSOLDERING CAN-CAPS.

Specification forming part of Letters Patent No. 103,125, dated May 17, 1870; reissue No, 6,846, dated January 11, 1876; application filed December 21, 1875.

*To all whom it may concern:*

Be it known that I, ABEL BARKER, of Wyoming, in the county of Luzerne and State of Pennsylvania, have invented certain new and useful Improvements in Can Openers and Closers; and I do hereby declare that the following is a full, clear, and exact description thereof, that will enable others skilled in the art to which it appertains to make and use the same, reference being had to the accompanying drawings, and to the letters of reference marked thereon, which form a part of this specification, in which—

Figure 1 is a vertical section; Fig. 2 is a representation of the machine as applied to the can in opening; Fig. 3, as applied in closing or sealing, with the disk withdrawn and the sliding rod pressed upon the cover to hold it until the solder or sealing material hardens.

The purpose of my invention is to provide a convenient machine or device for opening and closing or sealing fruit, oyster, and all other cans hermetically sealed.

In constructing the machine I make the disk, casting, or tool A of sufficient thickness to retain the heat, and of suitable size to cover the lid of the can, with the recess B in the under side to give room for the convex lid of the can, and to confine the soldering process to the outer edge of the lid or cover. To this disk I connect the handle C. In connection with the handle I use the small rod or wire D, which also passes through the center of the disk A, so as to allow it to slide up and down. In opening or unsealing a can, the tool A is sufficiently heated to melt the solder, and placed over the cover till the solder is melted, when it is taken off, and the cover removed by any sharp-pointed instrument. In closing or sealing a can, the cover is to be placed in proper position upon the can and solder laid upon the edge of the cover. The rod D is pushed down through the tool and placed upon the cover to hold it. The heated disk is then to be pushed down in contact with the solder until it is melted, then turned back and forth until the solder or sealing material is spread evenly around the edge of the cover. The disk is then to be withdrawn, with the rod still pressed upon the lid until the solder or sealing material sets or hardens, when the operation is completed.

I am aware that in the construction of cans the tops and bottoms have been soldered on by means of a circular surface and flange, forming part of a furnace, by which heat was applied to the seam and lap of the can, while the rest of the top or bottom was protected from the same degree of heat by an air-flue from below. In this method the solder was placed within the can, after the bottom or the top had been pressed on, and the can set upon the heated surface and within the flange, the mass of the solder insuring its application to all parts of the seam. Such a device cannot be used to solder can-caps, nor do I claim it.

What I claim as my invention, and desire to secure by Letters Patent of the United States, is—

1. For the purpose of soldering and unsoldering can-caps, a disk, circular casting, or soldering-tool, having a recess in the under side, and outside the recess an edge or surface, by means of which edge or surface the solder is melted and applied.

2. The disk or soldering-tool A, with the recess B in the under side, as set forth, in combination with the movable rod or wire D.

3. For soldering can-caps, the combination of a soldering-tool, which conforms in shape to the cap to be treated, and the rod or wire D.

In testimony that I claim the foregoing I have hereunto set my hand and seal this 13th day of May, 1875.

ABEL BARKER. [L. S.]

Witnesses:

THOS. HENRY ATHERTON,

L. W. DEWITT.